May 24, 1960  G. K. GANTSCHNIGG  2,937,573
BOMBING APPARATUS
Filed June 28, 1956  4 Sheets-Sheet 1

INVENTOR
GOTTFRIED K. GANTSCHNIGG
BY
Julian C. Renfro
ATTORNEY

May 24, 1960 G. K. GANTSCHNIGG 2,937,573
BOMBING APPARATUS
Filed June 28, 1956 4 Sheets-Sheet 2

INVENTOR
GOTTFRIED K. GANTSCHNIGG
BY
Julian C. Renfro
ATTORNEY

May 24, 1960  G. K. GANTSCHNIGG  2,937,573
BOMBING APPARATUS
Filed June 28, 1956  4 Sheets-Sheet 3

INVENTOR
GOTTFRIED K. GANTSCHNIGG
BY
Julian C. Renfro
ATTORNEY

May 24, 1960  G. K. GANTSCHNIGG  2,937,573
BOMBING APPARATUS

Filed June 28, 1956  4 Sheets-Sheet 4

INVENTOR
GOTTFRIED K. GANTSCHNIGG
BY
Julian C. Renfro
ATTORNEY

United States Patent Office 2,937,573
Patented May 24, 1960

2,937,573
BOMBING APPARATUS

Gottfried K. Gantschnigg, Baltimore, Md., assignor to The Martin Company, Middle River, Md., a corporation of Maryland Filed June 28, 1956, Ser. No. 594,473

7 Claims. (Cl. 89—1.5)

The present invention relates to apparatus for carrying and releasing bombs and other stores from high-speed aircraft, and more particularly to an improved bomb bay structure and allied apparatus for discharging bombs or similar stores from aircraft traveling at high speeds, utilizing a "retro-bombing" technique.

In conventional aircraft, bombs or like stores are generally housed within a bomb bay, and are attached by suitable shackles to the inner structure of the aircraft. The fuselage of the aircraft is typically provided with a pair of bomb bay doors adapted to pivot outwardly to form an opening through which the bombs or stores may be dropped. This arrangement, while generally satisfactory for conventional aircraft, operating at subsonic speeds, is undesirable for aircraft operating in the transonic or supersonic regimes, since the relatively large opening in the bottom of the fuselage causes an extremely turbulent flow of air in high-speed flight. Thus, it has been found that at supersonic speeds the air turbulence in and around the bomb bay opening is such that bombs released from their shackles in ordinary fashion will tumble around inside the bomb bay and will not be released properly from the aircraft. In addition to being an extremely dangerous condition, tumbling of the bombs by the turbulent air flow introduces large errors into the otherwise accurately timed release of the bombs. Moreover, the large bomb bay opening and the protruding bomb bay doors result in a substantial increase in drag at high speeds, tending to slow the aircraft during a critical bombing run.

Various arrangements have been suggested for reducing the turbulence and drag of the open bomb bay at high speeds, one such suggested arrangement being shown and described in the Woollens et al. United States Patent No. 2,634,656, which is assigned to the assignee of the present invention. In this patent, the use of a rotatable bomb bay door is illustrated, with the bombs mounted directly upon the door. The bombs are readied for release by rotating the door through 180 degrees, but even this arrangement is not always entirely satisfactory for use in extremely high-speed aircraft.

The present invention provides an improved bomb bay structure which minimizes drag and turbulence when in an open position whereby bombs or other stores may be effectively discharged from an aircraft moving at supersonic speeds. The new bomb bay apparatus or structure is designed to close smoothly and tightly against the bottom of the fuselage during normal flight, and to create a minimum disturbance in the turbulent air flow about the aircraft when the bomb bay is open for the discharge of bombs or stores. Moreover, whereas conventional bomb bay apparatus is such as to cause the bombs to tumble about in the bomb bay after release of the bombs at high speed, the new apparatus utilizes the force of the air flowing about the plane to assist in the discharge of the bombs or stores therefrom.

In the design of modern high-speed aircraft, it is desirable to provide a fuselage of minimum cross-section. Accordingly, the present invention provides a bomb bay structure and allied apparatus by means of which a load of bombs or stores may be carried in a practical minimum of space within the aircraft. Thus, the bomb bay of the present invention is generally in the form of a tube, with the bomb load carried on the walls of the tube and adapted for discharge in a direction longitudinally of the tube. As will be more apparent upon reference to the following description, this arrangement provides for a concentrated loading of the bombs or stores in a small space in the fuselage of the aircraft without interfering in any way with the proper discharge of the load.

The present invention also provides an improved arrangement for discharging bombs or stores in a longitudinal direction from a tubular bomb bay housing, in which means are attached to the bombs or stores for guiding and supporting them until they are properly released from the aircraft. Means are also provided for freeing the bombs or stores of the guide means substantially immediately following the release of the bombs or stores from the aircraft, so that proper free fall of the objects thus discharged is afforded.

In certain instances, to improve the accuracy of dropping bombs or stores at high speeds, it is desirable to eject the bombs from the aircraft at a substantial rearward velocity relative to the aircraft. Accordingly, the invention further provides an improved arrangement adapted for incorporation in modern high-speed aircraft, for ejecting the bombs or stores therefrom at a substantial rearward velocity.

The above and other objects and advantages of the invention will become apparent upon full consideration of the following detailed description and accompanying drawings in which.

Figure 6:
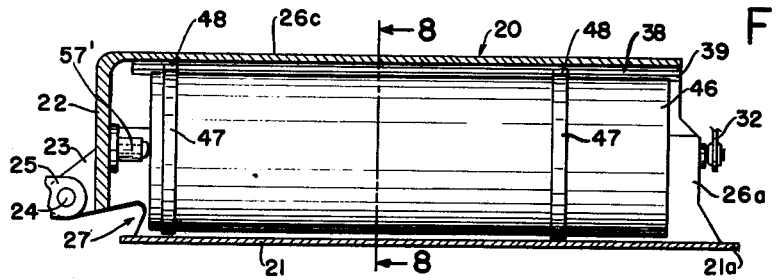
Fig. 6 is a longitudinal cross-sectional view of the bomb door of Figs. 2 and 3 supporting a single large-size bomb or stores container.
Figure 7:
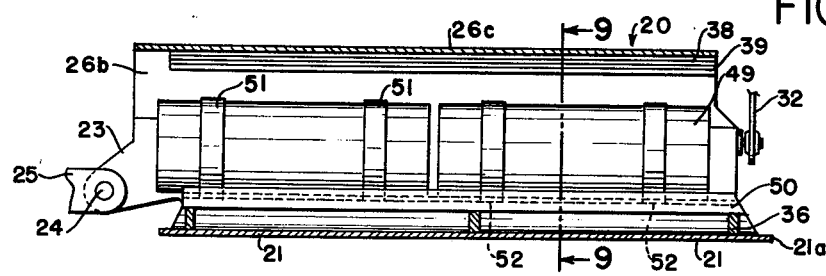
Fig. 7 is a longitudinal cross-sectional view of the bomb door supporting four smaller size bombs or stores containers.
Figure 8:
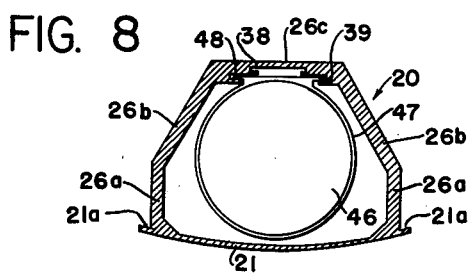
Figure 9:
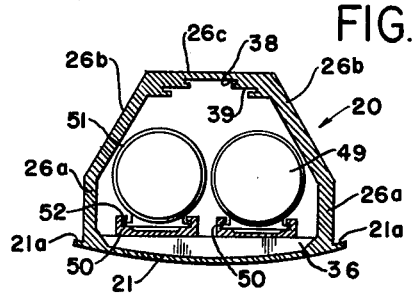
Figure 10:
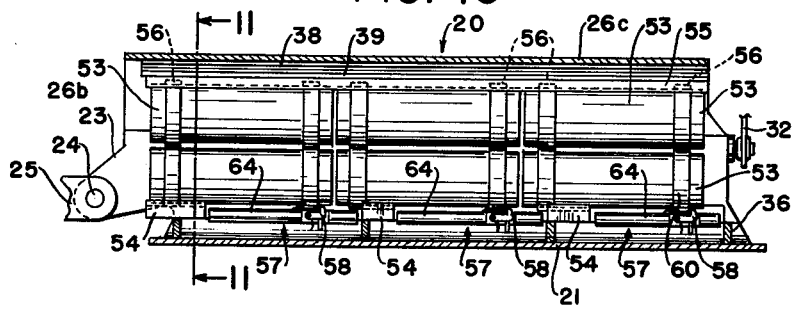
Figure 11:
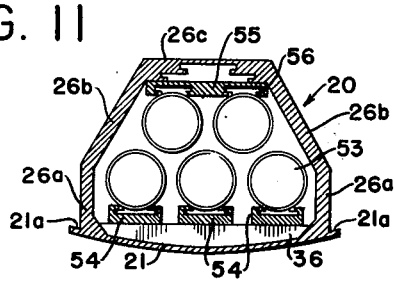
Figure 12:
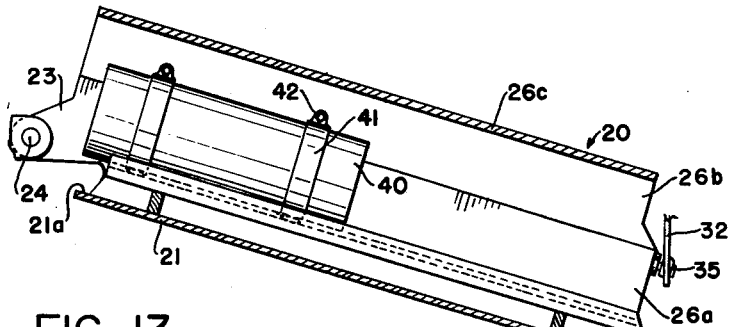
Figure 13:
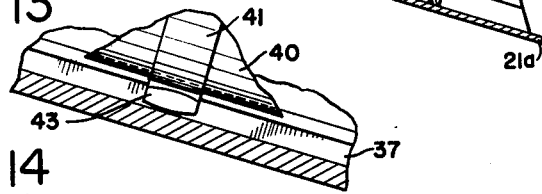
Figure 14:
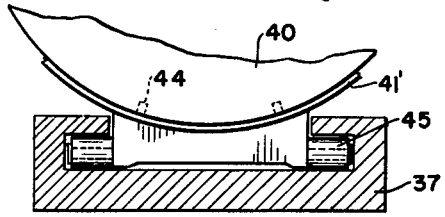
Figure 16:
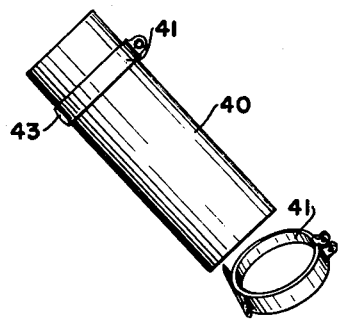
Figure 16:
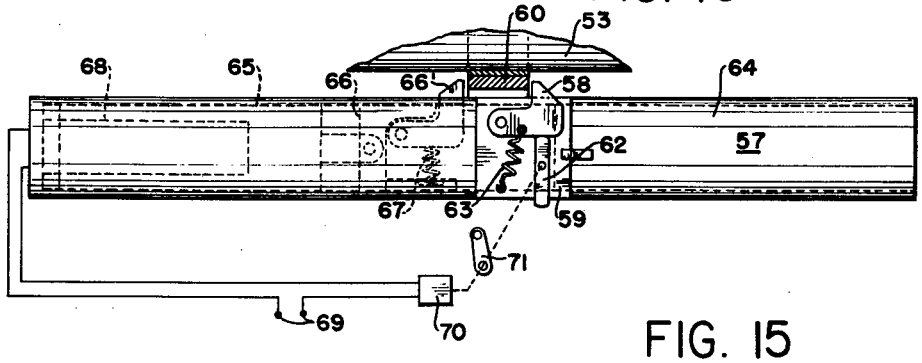
Figure 17:
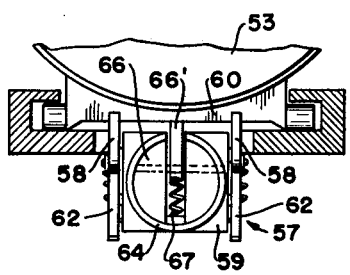
Figure 15:
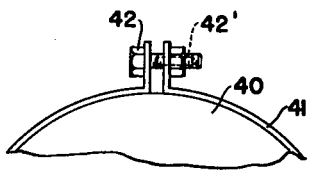
Figure 18:
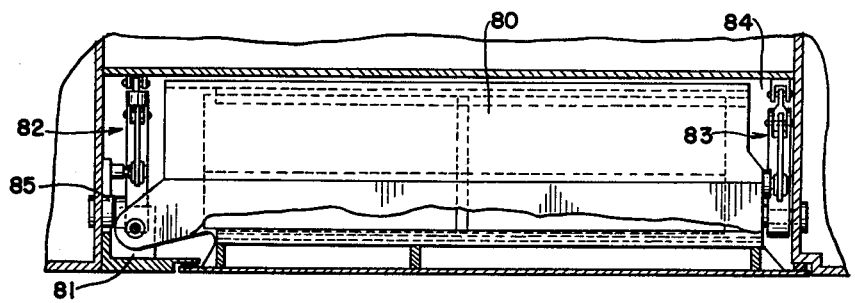
Figure 19:
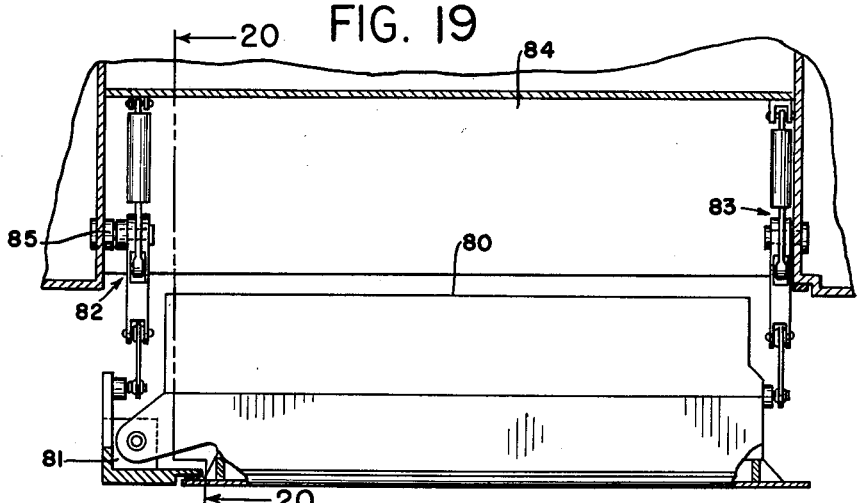
Figure 20:
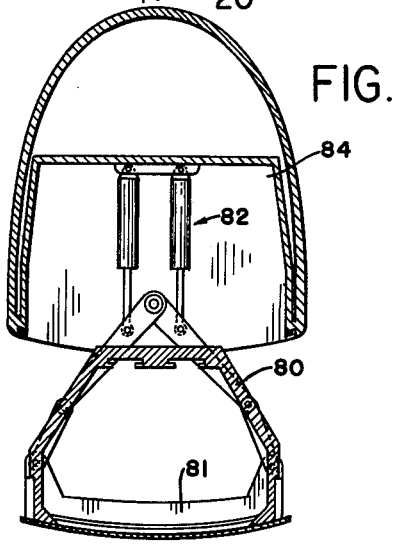

Figs. 8 and 9 are cross-sectional views taken along lines 8—8 and 9—9, respectively, of Figs. 6 and 7, respectively;

Fig. 10 is a longitudinal cross-sectional view of the bomb door supporting a large number of small-size bombs or stores containers;

Fig. 11 is a cross-sectional view taken along line 11—11 of Fig. 10;

Fig. 12 is a longitudinal cross-sectional view of the bomb door illustrating the manner in which a bomb or stores container is discharged therefrom;

Fig. 13 is an enlarged fragmentary cross-sectional view of means used for supporting and guiding a bomb or stores container in the bomb door;

Fig. 14 is an enlarged fragmentary cross-sectional view of another arrangement for supporting the bomb or stores container;

Fig. 15 is an enlarged fragmentary view of a guiding and supporting bracket used in connection with the new bomb bay apparatus and having an explosive bolt for releasing the bracket upon discharge of the bombs or stores containers;

Fig. 16 is an enlarged fragmentary view of an improved mechanism employed with the new bomb bay apparatus for discharging bombs or stores containers at a substantial rearward velocity relative to the aircraft;

Fig. 17 is a fragmentary end elevation, partly in section of the mechanism of Fig. 16;

Fig. 18 is a longitudinal cross-sectional view, with parts broken away, showing a modified form of the new apparatus;

Fig. 19 is a longitudinal cross-sectional view similar to that of Fig. 18, with the bomb door in a loading position; and Fig. 20 is a cross-sectional view taken along line 20—20 of Fig. 19.

Referring initially to Figs. 1–5, the numeral 10 designates generally a modern high-speed aircraft capable of supersonic flight. The aircraft 10 has a bomb bay 11 in the lower side of its fuselage, the bomb bay being constructed in accordance with the invention and illustrated in more detail in Figs. 2 through 5.

The aircraft 10 has a pair of spaced bulkheads 12, 13 located in the midsection of the fuselage and defining end walls of a bomb bay enclosure 14. An upper wall 15 completes the bomb bay enclosure, and generally isolates it from the interior of the aircraft. In the illustrated form of the invention, the upper wall 15 of the bomb bay includes short vertically extending side wall portions 15a, upwardly and inwardly extending wall portions 15b and a generally horizontal top wall portion 15c. The side wall portions 15a extend along the opposite side walls of the aircraft fuselage and terminate at the bottom wall thereof to define a bomb bay opening 16. The aft end of the bomb bay opening 16 is defined generally by the bulkhead 13, while the forward end of the opening is defined by a rearwardly projecting wall portion 17 of the aircraft fuselage. A recess 18 is formed about the entire perimeter of the bomb bay opening 16 and receives a sealing element 19 lying somewhat below the outer surface of the aircraft.

Figure 1:
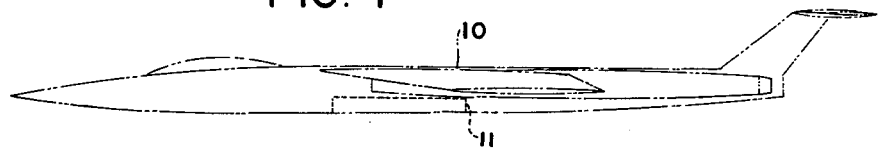
Fig. 1 is a simplified representation of a modern high-speed aircraft incorporating the improved apparatus of the present invention.
Figure 2:
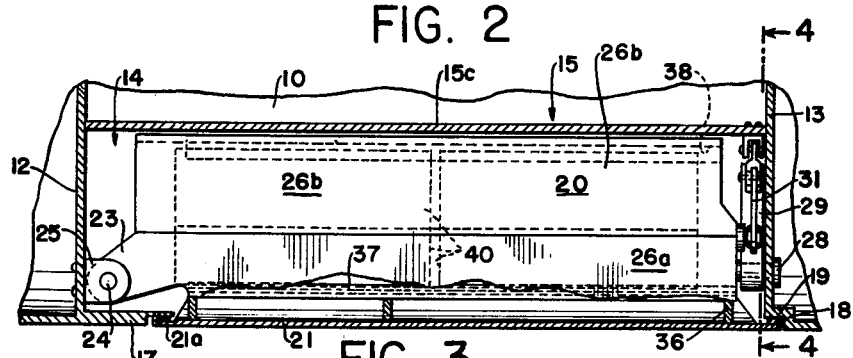
Fig. 2 is an enlarged fragmentary longitudinal cross-section taken through the aircraft of Fig. 1, and illustrating the bomb bay of the present invention.
Figures 4, 5:
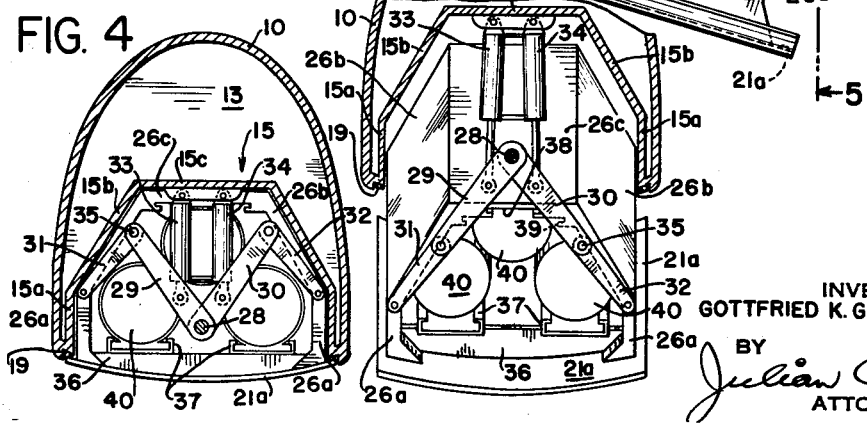
Fig. 4 is a cross-sectional view taken generally along line 4—4 of Fig. 2.
Fig. 5 is a fragmentary cross-sectional view taken generally along line 5—5 of Fig. 3.

Received within the bomb bay enclosure 14 is a bomb-carrying door 20 to contain the bombs (or stores) to be dropped. The door 20 is of a shape conforming generally with the interior of the enclosure 14, and having a bottom wall 21 with contours conforming to those of the aircraft 10, and forming a continuation of the aircraft contours when the door is in a retracted position, as shown in Figs. 2 and 4. The bottom wall 21 has flange portions 21a about its four edges which project beyond the general outlines of the door and are adapted to be received in the recesses 18 when the door 20 is in a retracted position. The flanges 21a firmly engage the sealing element 19 to form therewith an air-tight or liquid-tight seal.

Projecting forwardly from the sides of the door 20 are spaced arms 23 which are pivoted to the forward bulkhead 12 by means of pins 24 supported by spaced brackets 25. The arrangement is such that the bomb door 20 may be pivoted between retracted and open positions, as shown in Figs. 2 and 3, respectively; and, in accordance with the teachings of the invention, the pivotal axis defined by the pins 24 is spaced forwardly of the front bottom wall flange 21a.

Figure 3:
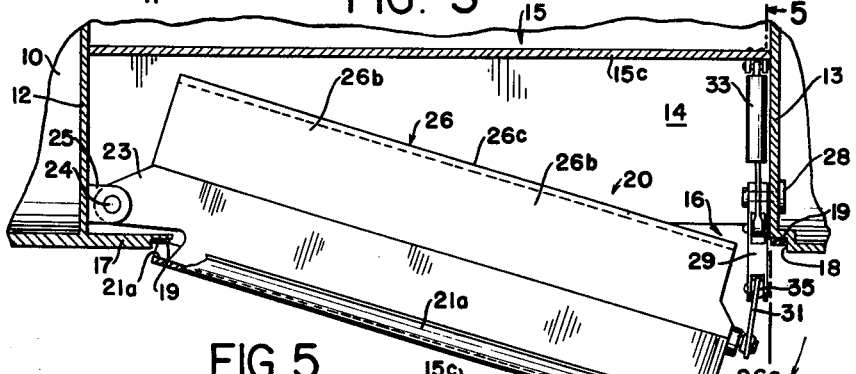
Fig. 3 is a longitudinal section view similar to Fig. 2 but showing the bomb bay in an open position.

As shown in Figs. 3–5, the bomb door 20 has an upper wall 26 including vertical side wall portions 26a, upwardly and inwardly extending wall portions 26b and a horizontal top wall portion 26c, the arrangement being such that the wall 26 closely conforms with the wall 15 of the bomb bay enclosure when the bomb door 20 is in a retracted position. The forward end of the bomb door 20 is reinforced by suitable framework, not specifically indicated, and provides an opening for reloading the door from the forward end. The aft end of the door 20 is also open, as shown in Figs. 4 and 5.

Mounted on the bulkhead 13, and projecting forwardly therefrom, is a pin 28 which pivotally mounts a pair of arms 29, 30. The arms 29, 30 are pivotally connected at their free ends to supporting links 31, 32, respectively, which are in turn pivotally connected to the bomb door 20, at the aft end thereof.

A pair of hydraulic cylinders 33, 34 are mounted on the top wall 15c of the bomb bay enclosure and are connected to the arms 29, 30, respectively, the arrangement being such that upon retraction of the actuators 33, 34 the arms 29, 30 will be pivoted upwardly about the pin 28, and upon extension of the actuators the arms 29, 30 will be pivoted downwardly about the pin 28. When the arms 29, 30 are drawn upwardly they act through the links 31, 32 to draw the aft end of the bomb door 20 upwardly into a retracted position, as shown in Figs. 2 and 4. When the cylinders 33, 34 are fully retracted, the flanges 21a about the bottom wall 21 of the bomb door are urged firmly against the sealing element 19 to effectively seal the bomb bay opening 16. When the actuators are fully extended, the arms 29, 30 are brought into alignment with the links 31, 32, substantially in the manner indicated in Fig. 5, so that the open aft end of the bomb door is lowered to lie completely outside of the bomb bay 14. The arms 29, 30 and links 31, 32 are so proportioned that when the actuators 33, 34 are extended the aligned arms and links lie approximately in the angularly disposed planes of the wall portions 26b of the bomb door, as indicated in Fig. 5, so that the open aft end of the tubular door 20 is free of any obstructions.

As will be observed in Fig. 3, when the actuators 33, 34 are extended, to lower the aft end of the bomb door, the housing pivots about the pin 24. The aft end of the door therefore moves through an arcuate path, and to accommodate such movement the links 31, 32 are connected to the arms 29, 30 and to the door 20 by suitable means 35 permitting a limited universal movement of the links.

It should be noted that when the aft end of the bomb door 20 is in its lowered position, the lower forward portion of the door is spaced below the lower wall portion 17 of the aircraft fuselage. This results from the fact that the supporting pin 24 is positioned forwardly of the forward edge of the wall 21, and as will subsequently appear, this feature is an important aspect of the invention.

In the apparatus shown in Figs. 2–5, the bomb door 20 is provided with a bottom structure 36 defining a flat upper surface upon which is mounted a pair of spaced longitudinally disposed guide channels 37. The channels 37 open upwardly and are provided with short inturned flange portions defining a restricted opening at the top of the channel. The upper wall of the bomb door is provided with channels 38, 39 of graduated sizes, as is more clearly illustrated in Fig. 9. The channels 38, 39 open downwardly and are also provided with inturned flanges defining restricted openings.

The apparatus of Figs. 2–5 is adapted to receive six bombs or stores containers, as indicated by the numeral 40. In accordance with the teachings of the invention, each of the bombs 40 is provided with a pair of mounting brackets of the type indicated at 41 in Fig. 12. The brackets 41 are generally in the form of circular clamps, being tightly secured about the bomb by means of bolts 42, and having oppositely extending lugs 43 lying in a plane approximately tangent to the bracket 41. Each bomb 40 has a bracket 41 near each end thereof, and the lugs 43 of both brackets lie in a common plane. The proper alignment of the brackets 41 is insured by providing each bracket with one or more pins of the type shown at 44 in Fig. 14, which are received in suitable openings in the bomb casing.

In accordance with the invention, the bombs 40 are loaded into the bomb door 20 by inserting the lugs 43 of the brackets 41 into the various channels provided therefor within the door. Thus, in the apparatus of Figs.

2-5, in which six bombs or stores containers are received, two bombs are inserted along each of the channels 37 at the bottom of the door, and in a like manner two bombs are received in the smaller one of the graduated channels 38, 39 in the top wall of the door. The bombs are thus compactly arranged within the door 20, occupying a minimum of space within the aircraft 10, and the arrangement is such that the plurality of longitudinal rows of bombs are spaced from each other, permitting any bomb to slide freely along its channel without interference from a bomb of another row.

As indicated in Fig. 12, when the aft end of the bomb door 20 is in its lowered position, the various channels form inclined ways along which the bombs 40 may slide to effect the discharge of the bombs from the open aft end of the door. In this respect, the lugs 43 guide and confine the bombs 40 as they move longitudinally along the channels, and until they are clear of the door 20.

As a bomb or container 40 emerges from the lower end of the door 20, the lugs 43 of the bracket 41 at the projecting end will become free of the guide channels. At the same time, the end of the bomb will enter the air stream and may be buffeted somewhat thereby. Accordingly, as illustrated in the enlarged view of Fig. 13, the lugs 43 have arcuate contours to avoid grabbing in the channels 37, 38 as the bombs emerge from the door 20. Alternately, modified mounting brackets 41' (Fig. 14) may be provided for the bombs in which suitable rollers 45 are employed in place of the lugs 43. The rollers 45 are also desirable in certain cases since they provide for a more friction-free movement of the bombs 40 in their guiding channels.

When a bomb 40 has been discharged from the door 20, the brackets 41 may undesirably effect the rate or direction of fall, and, accordingly, it is desirable that the brackets 41 be removed from the bomb as soon as possible after its discharge from the door 20. Thus, in accordance with the invention, each of the brackets 41 is secured to its bomb 40 by means of a volt 42 having an explosive charge 42' therein, as indicated in Fig. 15. The construction of the bolt 42 per se is not part of the present invention. However, the invention contemplates that the bolt 42 will be exploded in a suitable manner adapted to effect the explosion shortly after the bomb is discharged from the door 20. When the explosive bolts 42 are discharged and severed, the brackets 41 are spread slightly apart, and will readily slide off of the bomb 40 as indicated in Fig. 12.

Explosive bolts of this type are available, for example, from Beckman and Whitley Inc. of San Carlos, California. Bolts from this source are pyrotechnic in nature and are arranged to be detonated as a result of an electric impulse.

Referring now to Figs. 6–11, there are shown slightly modified arrangements of the new apparatus, in which the bomb door 20 is adapted for the reception of bombs or stores containers of various sizes. Thus, in Figs. 6 and 8, the door 20 receives a single large bomb or stores container 46 which occupies substantially the whole of the interior space of the tubular door. The bomb 46 is provided with a pair of brackets 47 having lugs 48 at the top which are received in the larger one of the graduated channels 38, 39 in the top of the door 20. In the apparatus of Figs. 6 and 8 the bottom structure 36 is removed to provide additional clearance for the bottom portion of the bomb 46.

In the apparatus of Figs. 7 and 9, four bombs or containers 49 of medium-large size are received. In this form of the apparatus, the bottom structure 36 is employed, and the door 20 supports a pair of longitudinally disposed channels 50. Each of the bombs 49 is provided with brackets 51 having lugs 52 at the bottom slidably received in the channel 50. The channels 38, 39 in the upper wall of the door 20 are unused in this modification.

In the modification of Figs. 10 and 11, fifteen bombs or containers 53, of small size, are arranged in five longitudinal rows of three each. The bottom structure 36 is incorporated in the door 20 and supports three parallel longitudinally disposed channels 54. The upper wall 26c of the housing mounts an adaptor plate 55 having a pair of longitudinally disposed channels 56 therein. As will be observed in Fig. 11, three longitudinally disposed rows of bombs 53 are held in the bottom channels 54, while two such rows of bombs are held in the upper channels 56. The arrangement is highly compact, as will be readily apparent, and the several rows of bombs are all spaced sufficiently from each other to avoid any interference between bombs of different rows.

It will be readily understood that the various modifications shown in Figs. 2–11 afford a convenient and wholly practical arrangement enabling the aircraft 10 to carry loads of various types. Thus, the bomb door 20 may be quickly adapted to receive various types of loads as may be desired under the circumstances.

Loading of bombs or stores into the door 20 may be advantageously carried out by disconnecting the door at its forward end and lowering the forward end below the aircraft fuselage by means of a suitable hoist, such as shown in the Woollens et al. Patent No. 2,634,656, for example. The aft end of the door may be lowered at the same time by appropriately energizing the fluid actuators 33, 34. The invention also contemplates that the door 20 may be bodily removed from the aircraft and replaced with a loaded door, so that the aircraft may be readied for a mission in a minimum of time.

In the form of the invention shown in Fig. 6, the door 20 is loaded from the aft end, since the forward end is partly closed off by the front wall 22.

After the bomb door 20 is fully loaded, the actuators 33, 34 are retracted to draw the aft end of the door into the bomb bay enclosure 14 of the aircraft, and tightly seal the bomb bay opening 16. In this condition, a minimum of resistance is offered to the high-speed flow of air over the surface of the aircraft.

When the aircraft enters a bombing run, the actuators 33, 34 are energized to extend, forcing the aft end of the door 20 out into the airstream, so that the lower end thereof lies below the bottom wall of the aircraft fuselage. When the aft end of the door is moved downwardly, the front flange 21a is moved downwardly away from the front edge of the bomb bay opening 16. Accordingly, there is a small space between the fuselage wall 17 and the front edge of the bottom wall 21 of the door. When the aircraft is in high-speed flight, air is caused to enter through the opening between the walls 17 and 21, and this air flows through and out of the aft end of the tubular door 20. This minimizes any drag forces caused by the protruding bomb door 20, and at the same time avoids excessive turbulence about the aft opening of the door 20. In addition, the flow of air through the tubular door 20 urges the bombs or containers therein toward the open end, to assist in the release and discharge of such bombs or containers at the desired time.

At the proper time during the bombing run, the bombs may be released, suitable means being provided for this purpose. When the bombs are released in their respective guiding channels, the force of gravity as well as the force of the air flowing through the door urges the bombs longitudinally in the channels toward the open end of the door. The bombs quickly and easily slide along the channels and are discharged through the open end of the door, below the bottom wall of the aircraft fuselage.

In some cases, it may be desirable to more forcibly discharge the bombs or containers from the door 20, and for this purpose an improved arrangement of the type shown in Figs. 10, 16 and 17 may be employed. Referring initially to Figs. 16 and 17, each of the guide channels in the door 20 is provided with one or more (depending on the number of bombs held in the channel) ejecting devices 57. Each ejecting device 57 includes a pair of latches 58 pivoted on a block 59 and having portions projecting upwardly into the channel at the rearward side of the bomb-engaging bracket 60. In their normal positions, the latches 58 lie in obstructing relation to the bracket 60, and prevent rearward movement thereof in the channel. The latches 58 are normally held in obstructing positions by cams 62 rotatably supported on the block 59. When the cams 62 are rotated, the latches 58 are retracted downwardly by suitable springs 63 so that the bomb is free to move rearwardly along its guiding channel.

The ejection device 57 includes a relatively elongated tube 64 which movably receives a piston 65. A block 66 is carried at the right-hand end of the piston 65 and pivotally mounts a pawl 66′ urged upwardly by a spring 67 and having a portion normally projecting into the channel on the forward side of the bracket 60. The rearward face of the pawl 66′ is generally vertical, while the forward face is inclined at a relatively large angle to the vertical, the arrangement being such that the pawl 66′ may be depressed against the spring 67 by an object moving to the right and striking the inclined forward surface of the pawl.

At the forward end of the ejector device is an explosive charge 68 adapted to be detonated by an electrical charge derived from a source 69, upon closure of a switch 70. The switch 70 is operated by a suitable lever 71, which is also coupled with the cams 62. Accordingly, when the lever 71 is actuated, the cams 62 are rotated to effect withdrawal of the latches 58 and at the same time the switch 70 is closed to detonate the explosive charge 68. The exploded charge 68 then drives the piston 65 to the right, causing the pawl 66′ to engage the forward edge of the bracket 60, rapidly accelerating the bomb 53. The bomb 53 is thus rapidly and forcibly ejected from the bomb door 20.

As shown in Fig. 10, a single guide channel may include a plurality of ejection devices 57, each adapted to eject a single bomb from the door 20. The separate ejection devices 57 may be actuated simultaneously or in sequence, starting with the rearwardmost device 57 and ending with the forwardmost device. As heretofore mentioned, a bomb ejected rearwardly from the forward end of the door 20 may freely pass over one or more ejection devices positioned toward the rear of the housing, since the inclined forward surfaces of the pawls 66′ permit any pawl to be readily depressed by a bomb moving to the aft.

In the form of the invention shown in Fig. 6, the bomb door 20 has a front wall 22 closing the forward end of the door, except for a small opening 27 along the lower edge of the wall. A suitable ejection device 57′ is mounted on the wall 22, in position to engage the forward end of the bomb, for discharging the bomb longitudinally of the door.

The present invention also contemplates that a suitable hydraulic, pneumatic, or mechanical system may be employed in place of the explosive charge 68 to eject the bomb in the manner desired. Moreover, it is contemplated that suitable means be provided in desired cases for ejecting the bombs rearwardly of the air craft at a speed relative thereto substantially equal to the ground speed of the aircraft. In this manner, the actual ground speed of the bomb will be substantially vertical.

In desirable cases, self-propelled weapons could be used, in which event the provision of ejection means is unnecessary, since the weapons may be fired rearwardly of the aircraft at a predetermined speed.

In the modified form of the invention shown in Figs. 18-20, a bomb door 80 is pivoted at its forward end to a slide block 81. The block 81 is supported in the aircraft by means of an actuator and linkage assembly 82, similar to an assembly 83 which raises and lowers the aft end of the door in a manner heretofore described.

In its normal position, the slide block 81 is received within the bomb bay 84 of the aircraft, being held in a raised position by the linkage 82 and confined by guide means 85. When the apparatus is thus arranged, it is employed in a manner similar to the apparatus heretofore described, and only the aft linkage 83 is actuated during bombing runs, with the bomb door pivoting about the rigidly held slide block 81.

Loading of bombs or stores with the modified apparatus may be easily carried out by actuating both the fore and aft mechanisms 82 and 83, so that the door is lowered bodily out of the bomb bay 84, into the position shown in Figs. 19 and 20. It is also contemplated that the modified bomb door 80 may be detached from its supports and replaced by a pre-loaded interchangeable door, where such procedure may be convenient or desirable.

The apparatus of the present invention has advantageous application in connection with modern high-speed aircraft, particularly those intended to operate at supersonic speeds. The new bomb bay and door is such as to provide a minimum resistance to the flow of air when the bomb door is in either its closed or open position. When the door is closed and retracted within the aircraft fuselage, an airtight seal is provided about the bomb bay opening, and the smooth outer contours of the fuselage are substantially continuous. When the bomb door is open during a bombing run, it is spaced only slightly from the fuselage at its forward end and acts to deflect the air outwardly with a minimum resistance to flow. Moreover, when the bomb door is open, a small opening is provided at the forward end of the door to provide for the flow of air therethrough. This acts to minimize turbulence at the aft end of the door, providing for a more satisfactory release of the bombs, and at the same time reduces the drag forces at the aft end of the door.

In the new apparatus, the bomb door is of generally tubular form, so that air flow may be properly channeled therethrough, and is arranged to receive a concentrated load of bombs or stores occupying a practical minimum of space within the aircraft. There is also provided a novel actuating mechanism for raising and lowering the aft end of the bomb door, including arms 29, 30, links 31, 32 and actuators 33, 34. The entire mechanism is housed wholly within the bomb bay enclosure and is operative to move the aft end of the door through a substantial arc, while at the same time providing that the aft end of the housing is free of obstruction when in the lowered position.

One of the more specific advantageous features of the invention is the use of longitudinal channels and brackets for guiding and supporting the bombs in the door 20. During normal flight, the bombs are held in place in the door 20 by means of the channel and brackets, and during the discharge of the bombs the same channels and brackets serve to guide the bombs out of the open end of the door 20 in an orderly manner and without any tumbling of the bombs, which might otherwise occur during a high-speed bombing run. The brackets gripping the bombs are also provided with explosive retaining bolts 42 which act on discharge of the bombs from the door 20 to free the brackets from the bomb, permitting the bomb to fall freely in the manner desired.

The new apparatus is extremely versatile, and may be readily adapted where desired to provide means for forcibly ejecting the bombs from the open ends of the door 20. With the improved ejector device, one or a plurality of bombs or containers may be ejected simultaneously or in sequence from a single guide channel. By proper design the ejector devices may be arranged to eject the bombs or containers the rearward velocity equal to the forward velocity of the aircraft so that the bombs descend vertically from the point of discharge.

It should be understood, however, that the specific apparatus herein illustrated and described is intended to be representative only, as many changes may be made therein without departing from the clear teachings of the invention. Accordingly, reference should be made to the following claims in determining the full scope of the invention.

I claim:

1. A precision retrobombing arrangement for an aircraft, said aircraft having a fuselage and a bomb bay disposed in the lower portion of said fuselage substantially along a vertical plane passing through the centerline of said aircraft, said fuselage having a lower wall surface, a bomb bay door capable of carrying bombs, closely fitted in said bomb bay and having a lower wall complementary to the contour of and abutting said lower wall surface of said fuselage, means pivotally supporting a forward portion of said door from a point forward of the forward end of said door, and above said lower fuselage wall surface, means for lowering the aft end of said door when bombs are to be dispersed therefrom, said door, when said aft end has been lowered, causing said forward edge to move below said lower fuselage wall surface so as to define between said lower fuselage wall surface and said forward edge of said door an opening for the influx of air, said door, when in a lowered position, defining a passageway through which air entering said opening may flow, and means on said door for guiding bombs longitudinally along said door, for dispersal from the aft end of said door, the proper dispersal of bombs from said door being aided by air flowing therethrough.

2. The retrobombing arrangement recited in claim 1, further characterized by said door having an upper wall portion, said guide means comprising channels of graduated size formed in said upper wall portion and adapted to receive bomb-engaging means of different sizes.

3. The retrobombing arrangement recited in claim 1, further characterized by said means for guiding bombs comprising at least one longitudinally disposed channel on said door, and bomb-engaging means slidably received in said channel.

4. The retrobombing arrangement recited in claim 1, further characterized by said means for guiding bombs comprising brackets slidably received in said channel and releasably engaging bombs disposed thereon.

5. A precision retrobombing arrangement for an aircraft, said aircraft having a fuselage, and a bomb bay disposed in the lower portion of said fuselage substantially along a vertical plane passing through the centerline of said aircraft, a bomb bay door, capable of carrying bombs, closely fitted in said bomb bay and having a lower wall complementary to the contour of and abutting said lower wall surface of said fuselage, means pivotally supporting a forward portion of said door from a point forward of the forward end of said door, and above said lower fuselage wall surface, means to lower the aft end of said door when bombs are to be dispersed therefrom, said door, when said aft end has been lowered, causing said forward edge to move below said lower fuselage wall surface so as to define between said lower fuselage wall surface and said forward edge of said door an opening for the influx of air, said door, when in a lowered position, defining a passageway through which air entering said opening may flow, means on said door for guiding bombs longitudinally along said door, for dispersal from the aft end of said door, said guide means including at least one longitudinally disposed guide channel mounted on said door, means slidably received in said channel for engaging bombs to be dispersed, and ejection means adapted to urge said bomb-engaging means along said channel toward the aft end of said door, the proper dispersal of bombs from said door being aided by air flowing therethrough.

6. The retrobombing arrangement recited in claim 5, further characterized by said ejection means comprising a cylinder, a piston movable in said cylinder, a pawl carried by said piston and adapted to engage said bomb-engaging means, abutment means obstructing movement of said bomb-engaging means in the dispersal direction, means to withdraw said abutment means from said bomb-engaging means when dispersal is desired, and means for driving said piston in said cylinder in the dispersal direction to eject said bombs.

7. The retrobombing arrangement recited in claim 5, further characterized by said door being of generally tubular configuration, with said means for lowering the aft end of said door comprising a pair of arms, and means for operating said arms to raise and lower said aft end of said door.

References Cited in the file of this patent

UNITED STATES PATENTS

| | | |
|---|---|---|
| 1,621,654 | Boos | Mar. 22, 1927 |
| 1,720,846 | Mather | July 16, 1929 |
| 2,374,885 | Nichols | May 1, 1945 |
| 2,381,332 | Boldt | Aug. 7, 1945 |
| 2,395,547 | Hojnowski | Feb. 26, 1946 |
| 2,506,976 | Tharratt | May 9, 1950 |
| 2,608,132 | Lauritsen | Aug. 26, 1952 |
| 2,709,947 | Woods | June 7, 1955 |
| 2,749,064 | Kuhlman | June 5, 1956 |
| 2,786,392 | Niedling | Mar. 26, 1957 |
| 2,792,755 | Lahde | May 21, 1957 |